US012577788B2

(12) United States Patent
Wilson et al.

(10) Patent No.: US 12,577,788 B2
(45) Date of Patent: Mar. 17, 2026

(54) DUAL GASKET ASSEMBLY FOR SEALING PANEL-TO-PANEL JOINTS

(71) Applicants: DDP SPECIALTY ELECTRONC MATERIALS US, LLC, Wilmington, DE (US); DUPONT SAFETY & CONSTRUCTION, INC., Wilmington, DE (US)

(72) Inventors: Timothy D. Wilson, Wilmigton, DE (US); James Dean Katsaros, Wilmington, DE (US); Andrea Wagner Watts, Midland, MI (US); Jeffrey Hutchins, Buffalo, NY (US)

(73) Assignees: DDP SPECIALTY ELECTRONIC MATERIALS US, LLC, Wilmington, DE (US); DUPONT SAFETY & CONSTRUCTION, INC., Wilmington, DE (US)

( * ) Notice: Subject to any disclaimer, the term of this patent is extended or adjusted under 35 U.S.C. 154(b) by 214 days.

(21) Appl. No.: 18/307,282

(22) Filed: Apr. 26, 2023

(65) Prior Publication Data
US 2023/0358055 A1 Nov. 9, 2023

Related U.S. Application Data

(60) Provisional application No. 63/339,071, filed on May 6, 2022.

(51) Int. Cl.
E04F 13/08 (2006.01)
F16J 15/02 (2006.01)

(52) U.S. Cl.
CPC ......... E04F 13/0898 (2013.01); F16J 15/027 (2013.01)

(58) Field of Classification Search
CPC .......... E04B 2/822; E04B 2/02; E04B 2/7409; E04B 2002/0243; E04B 2002/0247;
(Continued)

(56) References Cited

U.S. PATENT DOCUMENTS 3,803,787 A * 4/1974 Daggy ................. E04B 2/7409
52/241
5,289,664 A 3/1994 Rizza et al.
(Continued)

FOREIGN PATENT DOCUMENTS

DE 2347007 A1 3/1975
GB 923776 A 4/1963
(Continued)

OTHER PUBLICATIONS

Foreign translation of JP H0949269A attached (Year: 1997).*
PCT International Search Report for Application No. PCT/US2023/018299; Sibille Dieterle, Authorized Officer; ISA/EPO; Jul. 20, 2023.
(Continued)

*Primary Examiner* — Jonathan Liu

(57) ABSTRACT

A dual gasket assembly suitable for sealing an abutment joint between two wall panels, the dual gasket assembly comprising a support coupling, a compressible interior gasket, and a compressible outer weather gasket, the support coupling comprising a base with a top surface having interior and exterior gasket supports separated by at least one gutter channel for directing water, the compressible interior and exterior gaskets attached to their respective interior and exterior gaskets supports; and the base bottom surface having a contact area for stabilizing the support coupling on a wall panel edge face and an attachment area for attaching the support coupling to said edge face, the attachment area being at least one surface, projection, or cavity.

9 Claims, 9 Drawing Sheets

(58) Field of Classification Search
CPC .... E04B 2002/025; E04B 1/6813; E04B 1/68;
E04B 1/6812; E04F 13/0889; E04F
13/076; E04F 13/0898
See application file for complete search history.

(56) References Cited

U.S. PATENT DOCUMENTS

| | | | | |
|---|---|---|---|---|
| 5,893,244 A * | 4/1999 | Magoon | ................ | E04B 2/965 |
| | | | | 52/716.2 |
| 6,823,633 B2 | 11/2004 | Ryan | | |
| 8,033,066 B2 * | 10/2011 | Griffiths | .............. | E04F 13/0889 |
| | | | | 52/510 |
| 10,385,973 B2 | 8/2019 | McGrath | | |
| 11,885,118 B1 * | 1/2024 | Neiman | ................ | E04B 1/6179 |
| 2015/0276060 A1 | 10/2015 | McGrath | | |
| 2019/0078323 A1 * | 3/2019 | Strickland | ............. | E04B 1/6812 |

FOREIGN PATENT DOCUMENTS

| | | | |
|---|---|---|---|
| GB | 1494854 A | | 12/1977 |
| JP | H0949269 A | * | 2/1997 |
| WO | 2018009129 A1 | | 1/2018 |

OTHER PUBLICATIONS

PCT International Search Report for Application No. PCT/US2023/018308; Charbel Melhem, Authorized Officer; ISA/EPO; Jul. 5, 2023.

PCT International Search Report for Application No. PCT/US2023/018317; Charbel Melhem, Authorized Officer; ISA/EPO; Jul. 5, 2023.

PCT International Search Report for Application No. PCT/US2023/018319; Sibille Dieterle, Authorized Officer; ISA/EPO; Jul. 24, 2023.

PCT International Search Report for Application No. PCT/US2023/018281; Sibille Dieterle, Authorized Officer; ISA/EPO; Jul. 20, 2023.

* cited by examiner

DUAL GASKET ASSEMBLY FOR SEALING PANEL-TO-PANEL JOINTS

BACKGROUND OF THE INVENTION

Field of the Invention

This invention relates to a dual gasket assembly that is suitable for sealing abutment joints between panels in commercial and other construction. It can be especially useful with prefabricated wall panels and in prefabricated wall assemblies in that the joint sealing features can be pre-installed on individual wall panels prior to the panels being incorporated into a wall. As used herein, "panel" and "wall panel" are used interchangeably.

Description of Related Art

In some buildings the outer walls can be non-structural and carry no major structural load other than its own weight. The major function of these outer walls is to keep the weather out. Such outer walls can comprise a series of wall panels that are connected to a building support structure of columns and floors that carry the bulk of the structural load of the building. The wall panels are normally designed to resist air and water infiltration, absorb sway induced by wind and seismic forces acting on the building, withstand wind loads, and support their own weight. While individual panels may span multiple floors and have varying lengths, there is a challenge in sealing the abutment joints between panels; that is, sealing the small gaps between the edge faces of individual panels in the final wall. These sealed abutment joints need to meet design requirements relating to various building codes, along with other desired performance expectations (e.g., thermal expansion and contraction; building sway and movement; water diversion; and thermal efficiency).

The gaps between the edge faces of individual wall panels, referred to as "abutment joints" or "panel-to-panel joints" interchangeably herein, have traditionally been sealed from the exterior of the building after the wall panels have been placed in position and attached to the building support structure. In one traditional process, after installation of the panels, the gaps between the panels are sealed by first forcing a resilient support, known as a backer rod, into the gap from the outside of the building. This backer rod serves as a support for subsequently manually injecting a wet (liquid) sealant onto the exteriorly-oriented surface of the backer rod from the exterior of the building. Optionally, the interiorly-oriented surface of the backer rod can additionally be manually sealed in a similar manner with a wet (liquid) sealant from the interior of the building if a double seal is desired. The wet sealant fills at least a portion of the gap between the edges of the two abutting panels and provides an essentially permanently-fixed air and water seal, supported by the backer rod, once the sealant cures.

A high degree of workmanship, sometimes at considerable height and undesirable weather conditions, is needed to create an effective air and water seal. Long cure times for the wet sealant can also impact construction schedules. All of these sealing activities on the exterior of a multi-story wall after the wall installation involves significant cost for personnel lifts or scaffolding and the associated safety concerns.

Therefore, what is needed is a method for sealing panel-to-panel joints that does not require extensive work on the exterior of the wall to seal these joints after the panels are set in place forming the wall.

BRIEF SUMMARY OF THE INVENTION

This invention relates to a dual gasket assembly suitable for sealing an abutment joint between two wall panels, the abutment joint having a length, width, and breadth, the dual gasket assembly comprising a support coupling, a compressible interior gasket, and a compressible outer weather gasket, the support coupling comprising a base, the base having a top surface and a bottom surface, the top surface of the base having at least one gutter channel for directing water, the top surface further having an interior gasket support and an exterior gasket support, the interior gasket support and the exterior gasket support separated by the at least one gutter channel, the compressible interior gasket attached to the interior gasket support and the compressible outer weather gasket attached to the exterior gasket support; and the bottom surface of the base having a contact area for stabilizing the support coupling on an edge face of one of the two wall panels, the bottom surface further having an attachment area for attaching the support coupling to said edge face, the attachment area being at least one surface, projection, or cavity.

DETAILED DESCRIPTION OF THE INVENTION

This invention relates to sealing features and methods for sealing abutment joints between panels, preferably panel-to-panel joints in commercial wall construction, and products that contain such sealing features, along with features for drainage of any water that may collect in any such joints. As used herein, the phrases "abutment joint" and "panel-to-panel joint" are interchangeable and mean a gap between the edge faces of two adjacent panels, especially in a wall system. The word panel is intended to include but is not limited to, a panel used as a building wall component. The panel can be of any inorganic or organic material, including metal, glass, concrete, wood, and composite materials. Further, unless otherwise indicated, there is no implied limitation on the orientation, design, or shape of the panels; while many building walls are generally vertically oriented and rectangular in shape, the inventions described herein can be applied to all panel-to-panel joints of any orientation or type useful in buildings. The inventions described herein can further relate to joint sealing features that are pre-installed on individual panels prior to the panels being incorporated into a wall.

Specifically, the inventions disclosed herein relate to dual gasket assemblies for sealing one or more abutment joints, and their use in panel modules and paneled wall systems, along with those panel modules and paneled walls and other components that are used in those walls, along with processes for making all of these inventions. In addition, the inventions disclosed herein include features specifically designed to manage and drain any water that may inadvertently collect in the dual gasket assemblies.

In some embodiments, these inventions are made at a construction site and then used to build a wall of a building; while in some embodiments, the invention is prefabricated. By "prefabricated" it is meant an item is made a manufacturing facility or some site remote to a construction site where a wall will be erected. This can allow for economies of scale in the manufacture of items and the items can also be stored until ready for use; when needed, the items can be distributed to one or more building site(s) as needed. Intuitively, the use of prefabricated items should reduce the time required to build and seal paneled walls at a construction site.

Figures 5, 6:
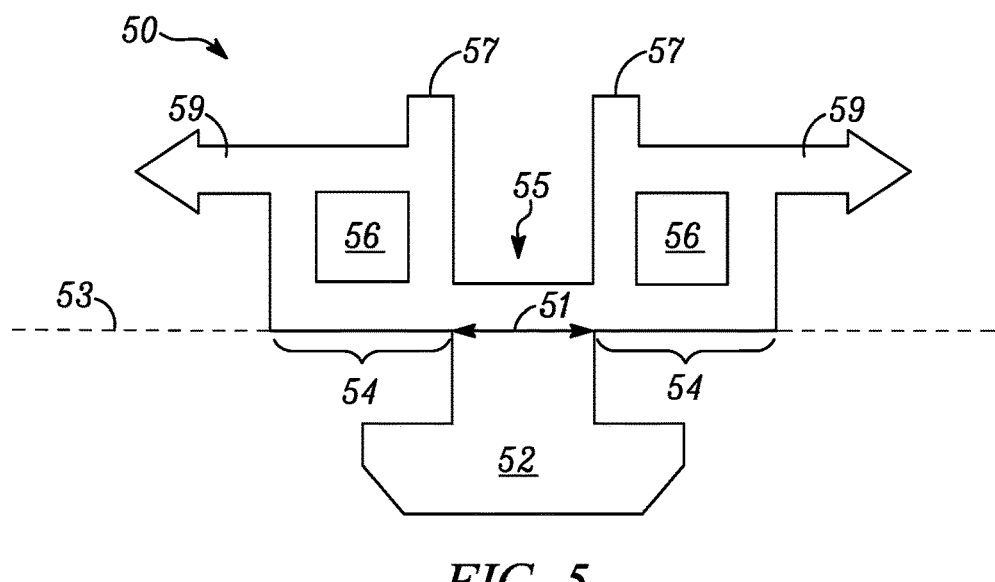
FIG. 5 is a cross-sectional view of an embodiment of the bottom surface of the base of a support coupling wherein the attachment area is at least one projection.
FIG. 6 is a perspective view of a building illustrating one example of a plurality of panels coupled together to form the building exterior; in this illustration the panels are rectangular with sealed panel-to-panel joints between the panels.

FIG. 6 is a perspective view of a building 62 illustrating one example of a plurality of panels 60 (not all labeled) coupled to the building's support structure. In this illustration the panels are rectangular having a major face (exterior face) having certain vertical height H and certain horizontal width W; and there are panel-to-panel joints between the panels, represented in this figure by panel-to-panel joint lines 64a, 64b, 64c, and 64d.

The panels 60 are shown arranged in a side-by-side configuration. The panels can be in line with one another, as shown, or offset with respect to one another (not shown). As represented in this figure, the panels 60 are typically modular such they are substantial duplicates or one another. However, the building may include panels that are different from each other, such as panels having a different size, shape, and/or configuration. For example, as shown in FIG. 6, the panels 60 on one side of the building are smaller than the panels 66 (not all labeled) on another side of the building.

This configuration of panels in the building wall assembly shown in FIG. 6 illustrates four panel-to-panel joints 64a, 64b, 64c, and 64d around one of the rectangular panels 60. In this configuration, the building wall assembly presents a substantially continuous exterior surface of the building. In other wall assemblies, it is possible for the panels to be arranged such that only two panel-to-panel joints would need to be sealed. For example, in one type of wall assembly, as shown as the bottom part of the building 62 in FIG. 6, the individual panels 68 (not all labeled) could be of sufficient size and arrangement such that the only panel-to-panel joints would be vertically-oriented joints, for example, lines 69a and 69b. Conversely, the panel size and arrangement could be such that the only panel-to-panel joints are horizontally-oriented joints. Many combinations are possible, as are the orientations of the abutment joints. The panels may span less than one story, one story, or more than one story of the structure. Wall assemblies comprising wall panels can represent an entire skin (or exterior facade) of a building, or just a portion thereof.

Dual Gasket Assembly

Figures 1, 2:
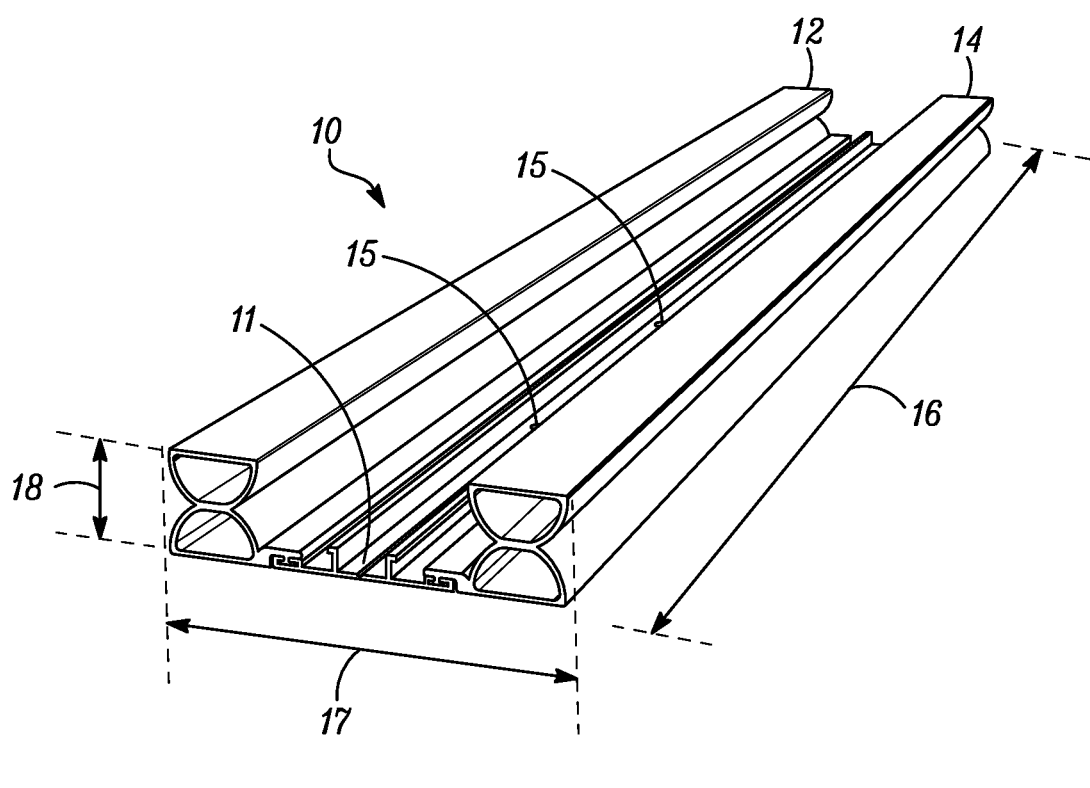
FIG. 1 is a perspective view of one example of a dual gasket assembly comprising a support coupling, a compressible interior gasket, and a compressible outer weather gasket.
FIG. 2, is a perspective view of an abutment joint between the edge faces of two panels, the abutment joint having a length, width, and breadth.

The sealing of panel-to-panel joints utilizes a dual gasket assembly. FIG. 1 is a perspective view of one example of a dual gasket assembly 10 comprising a support coupling 11, a compressible interior gasket 12, and a compressible outer weather gasket 14. The dual gasket assembly further has at least one gutter channel for directing water; in this figure, the gutter channel has an optional series of holes 15 for attaching the support coupling to an edge face.

The dual gasket assembly is suitable for sealing an abutment joint 20 between the edge faces of two panels as shown in FIG. 2, wherein the abutment joint has a length, width, and breadth. For clarity of the illustration, FIG. 2 illustrates two panels that have been rotated 90 degrees from a vertical position to a general horizontal position, the two panels having two major faces 21 & 22 with abutment joint 20 (not drawn to scale) between the edge faces, the edge faces being perpendicular to the major faces of the panels. The length 23 of the abutment joint is the length of the larger edge face dimension that can be sealed as measured parallel to the plane of the panel. The width 24 of the abutment joint is the shorter edge face dimension that can be sealed as measured perpendicular to both the length 23 of the abutment joint and also perpendicular to the plane of the panel; the width of the abutment joint is essentially the thickness of a panel, assuming the abutment joint is between two panels of equal thickness. If the thicknesses of the two panels is different, then the width of the abutment joint is the thickness of the thinner panel. The breadth 25 of the abutment joint is the face-to-face distance between the two edge faces to be sealed. While not drawn to scale in FIG. 2 for clarity in defining the dimensions, the breadth 25 of the abutment joint (the gap between the edge faces when the panels are installed in a wall) can be and is typically much less than the width 24 of the abutment joint (which is typically the width of the panels). For example, the width 24 of the abutment joint could be 4 to 8 inches, while the breadth 25 of the abutment joint could be ½ to 1 inch.

Likewise, as shown in FIG. 1, the dual gasket assembly has a generally elongated rectangular footprint on the edge face of a wall panel and is configured to be attached to the edge face of a wall panel, and therefore has a length 16, width 17, and breadth 18 measured in a similar manner to the length 23, width 24, breadth 25 of the abutment joint. Specifically, the length 16 of the dual gasket assembly 10 is the overall centerline length of the long dimension of the dual gasket assembly. That length, along with the individual lengths of the components of the dual gasket assembly (support coupling 11, compressible interior gasket 12, and the compressible outer weather gasket 14) are all measured generally parallel to the length 23 of the abutment joint that will be sealed. The length 16 of the dual gasket assembly, or parts of the dual gasket assembly, can be longer, equal to, or shorter than the length 23 of the abutment joint. In particular, in some arrangements it can be desirable that the lengths of the compressible interior gasket 12 and the compressible outer weather gasket 14 be longer or shorter than the length 23 of any particular abutment joint, with the length of the support coupling 11 either being the same as or shorter than the length 23 of the abutment joint. For example, it may be desirous to have the ends of two adjacent horizontally-oriented compressible outer weather gaskets that are sealing two horizontal abutment joints between two sets of adjacent panels meet at the vertical abutment joint between the two sets of panels. Each of the compressible outer weather gaskets could therefore be slightly longer than the horizontal abutment joint they are sealing; the actual length would be determined by the width of any gasket connector used to connect the two gasket ends.

The width 17 of the dual gasket assembly is the next largest length dimension measured perpendicular to the length 16 of the dual gasket assembly, which is the length that is parallel to the width 24 of the abutment joint. I some embodiments, the width 24 of the abutment joint is substantially more than the width 17 of the dual gasket assembly; in some embodiments, the width 17 of the dual gasket assembly is 50% or less than the width 24 of the abutment joint. In some embodiments, the width 17 of the dual gasket assembly is 25% or less than the width 24 of the abutment joint.

The breadth 18 of the dual gasket assembly is the thickness of the dual gasket assembly. This is the distance between the outer contact faces of the gasket; that is, the outermost part of each gasket that will contact the edge faces of each panel that forms the abutment joint. The term "original breadth" of the dual gasket assembly, as used herein, is the breadth of the dual gasket assembly prior to compression of the gaskets. The dual gasket assembly preferably has an original breadth 18 that is greater than the breadth 25 of the abutment joint between the two wall panels.

Figure 3:
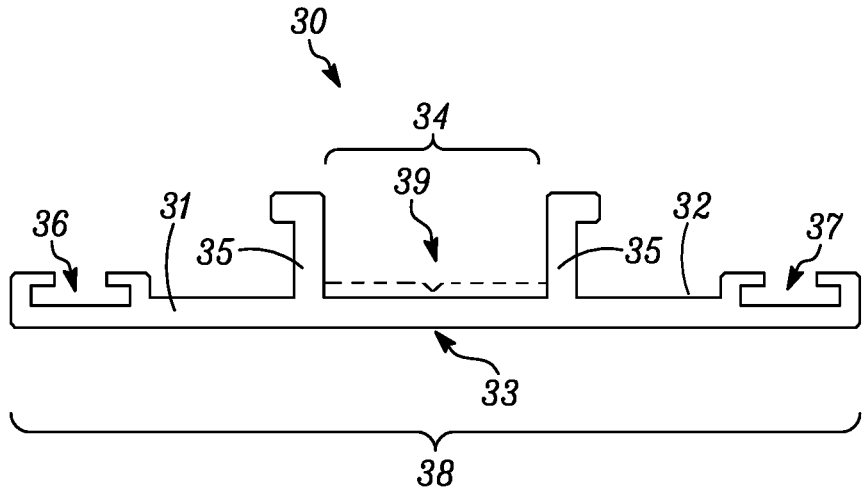
FIG. 3 is a cross-sectional view of one preferred embodiment of a support coupling for the dual gasket assembly, further having at least one gutter channel for directing water.

FIG. 3 is a cross-sectional or end view of an embodiment of a support coupling for the dual gasket assembly. The support coupling 30 comprises an elongate body having a base 31, the base having a top surface 32 and a bottom surface 33, the top surface of the base having at least one gutter channel 34 for directing water. In this embodiment, the gutter channel is formed between two weirs 35 on the top surface of the support coupling. The top surface of the base further has an interior gasket support 36 and an exterior gasket support 37, and the interior gasket support and the exterior gasket support are separated by the at least one gutter channel 34 for directing water. The compressible interior gasket is then attached to the interior gasket support and the compressible outer weather gasket is attached to the exterior gasket support (gaskets are not shown attached in FIG. 3). In the embodiment of FIG. 3, both the interior gasket support 36 and the exterior gasket support 37 have a c-shaped gasket retention cavity, a c-shaped channel parallel to and extending the length of the support coupling of the dual gasket assembly, designed to be used with the compressible interior gasket and a compressible outer weather gasket, wherein each gasket has a compatible T-shaped projection. In some embodiments, the support coupling has a length, parallel to the length of the dual gasket assembly, that corresponds to the length of the abutment joint between the edge faces of the two wall panels to be sealed.

The bottom surface 33 of the base 31 of the support coupling 30 has a contact area 38 for stabilizing the support coupling on an edge face of one of the two wall panels. This bottom surface further has an attachment area for attaching the support coupling to the edge face, the attachment area being at least one surface, projection, or cavity.

In the shown embodiment of FIG. 3, the entire bottom surface of the base is the contact area 38, and many different attachment area options are available. For example, if sufficient for the application, the support coupling can be attached to an edge face by applying adhesive strips or adhesive foam to the bottom surface 33 of the base of the support coupling in an attachment area that could be a part or all of the contact area 38 of the support coupling. Optionally, the contact area of the base of the support coupling can have a set of holes 15 (FIG. 1) extending from the top surface 32 to the bottom surface 33 for use with a set of fasteners (e.g., screws, nails, etc.) to secure the contact area to the edge face of a panel, the holes being the attachment area.

An optional support coupling feature 39 is also shown in FIG. 3, which is the base can be made thicker in the gutter channel as shown by the dotted line, for additional reinforcing of the support coupling. Additionally, if desired, that area can be further provided with a v-notch extending the length of the support coupling. The v-notch can be used when pre-drilled holes are not present to prevent the "walking" of self-drilling screw fasteners (such as self-tapping screws) when they are used to attach the support coupling to an edge face.

Figure 4:
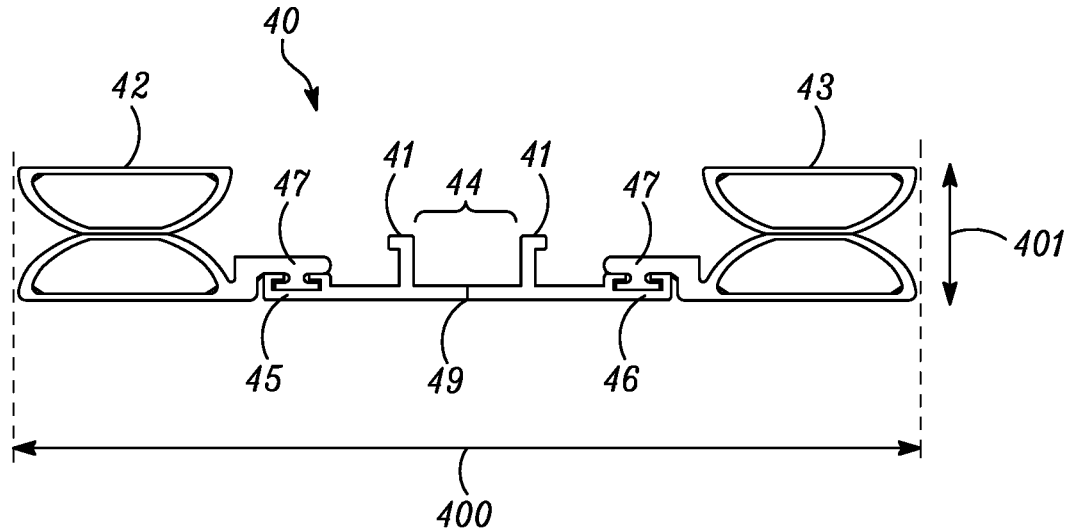
FIG. 4 is a cross-sectional view of a preferred dual gasket assembly comprising a support coupling, a compressible interior gasket, and a compressible outer weather gasket, further having at least one gutter channel for directing water.

FIG. 4 is a cross-sectional view of a preferred dual gasket assembly 40 comprising a support coupling 41, a compressible interior gasket 42, and a compressible outer weather gasket 43. In this embodiment, the compressible interior gasket 42 and a compressible outer weather gasket 43 have a hollow, flattened, hour-glass shape, the flattened or straight sides of the hour-glass (the contact faces) configured to match with the planar edge face of the panels to be sealed. The compressible interior gasket and the compressible outer weather gasket are attached to the support coupling via gasket supports (45 & 46) on opposing ends of the support coupling, the interior gasket support 45 and the exterior gasket support 46 separated by at least one gutter channel 44 for directing water.

Attaching the compressible interior gasket and the compressible outer weather gasket on opposing sides of the at least one gutter provides the advantages of a redundant gasketing system that further allows a mechanism to collect and drain away any liquid water that might breech the compressible outer weather gasket, or any liquid water that might condense between the gaskets; the compressible outer weather gasket generally facing the outside environment of the wall while the compressible interior gasket generally faces the inside environment of the wall.

In the embodiment shown in FIG. 4, both the interior gasket support 45 and the exterior gasket support 46 have a c-shaped gasket retention cavity, and the compressible interior gasket 42 and a compressible outer weather gasket 43 each have a compatible T-shaped projection 47 that is seated in each c-shaped cavity. FIG. 4 further illustrates an optional set of holes 49 through the base of the support coupling for use with a set of fasteners (e.g., screws, nails, etc.) to secure the contact area to the edge face of a panel. In some embodiments, the dual gasket assembly has a length corresponding to the length of the abutment joint between the two wall panels.

FIG. 4 further illustrates the width and breadth dimensions of the dual gasket assembly, both of which can be measured perpendicular to the length of the dual gasket assembly. The width of the dual gasket assembly is the dimension 400 in FIG. 4, that is the dimension that will be parallel to the width dimension of the abutment joint that is to be sealed; the compressible interior gasket 42, the support coupling 41, and the compressible outer weather gasket 43 all contribute to the width of the dual gasket assembly. That is, the width of the dual gasket assembly is the distance from an outer periphery of the compressible interior gasket to an outer periphery of the compressible outer weather gasket as shown. The original breadth of the dual gasket assembly is also shown in FIG. 4, i.e., the dual gasket assembly wherein the gaskets are in an uncompressed state. In some embodiments, the dual gasket assembly has a width as measured perpendicular to both the length and breadth of the dual gasket assembly; the width being measured from the maximum outer periphery of the compressible interior gasket to the maximum outer periphery of the compressible outer weather gasket, which is generally less than the width of the abutment joint between the two wall panels.

The original breadth of the dual gasket assembly is the thickness of the dual gasket assembly prior to any compression of the gaskets in the sealing of an abutment joint. The original breadth is the distance between the outermost part of each gasket that will contact the edge faces of the panel is shown by the dimension 401 in FIG. 4. In that figure, the flat edge faces shown on the compressible interior gasket and the flat edge faces shown on the compressible outer weather gasket are the outermost part from which the original breadth is measured. For the purposes herein, the breadth of the dual gasket assembly is measured excluding any projections extending from the base; only the gasket measurements are considered. Further, while gaskets having flat faces are illustrated in the figures, other shapes are possible, and in that instance the original breadth of the dual gasket assembly is the maximum thickness of the uncompressed gasket as measured perpendicular to the base of the support coupling.

To form a seal, the dual gasket assembly has an original breadth that is more than the breadth of the abutment joint between the two panels to be sealed. Once the dual gasket assembly has sealed an abutment joint between the two panels, the installed breadth of the dual gasket assembly is preferably the same as the breadth of the abutment joint between the two panels.

The interior gasket support (36,45) and exterior gasket support (37,46) are preferably made integral with the support coupling base. If desired, each of the gasket support can further be made integral with its associated gasket. However, in some embodiments it can be desirable to make only the compressible interior gasket integral with a gasket support and allow the compressible outer weather gasket to remain removable from the support, so that it can be replaced if necessary due to weathering.

In the embodiments of the support coupling and dual gasket assembly shown in FIGS. 3 & 4, each interior gasket support (36,45) and exterior gasket support (37,46) has a gasket retention cavity for attaching the compressible interior gasket 42 and compressible outer weather gasket 43, respectively, via a gasket retention projection 47 extending from each of the respective gaskets. However, either or both of the gasket supports in the set could have a gasket retention projection for attaching its respective gasket, with the respective gasket(s) having a matching cavity for seating the associated gasket retention projection.

Specifically, in some embodiments, the compressible interior gasket of the dual gasket assembly is attached to the interior gasket support by either
  i) a projection extending from the interior gasket support seated in a cavity in the compressible interior gasket, or
  ii) a projection extending from the compressible interior gasket seated in a cavity in the interior gasket support.

In some embodiments, the compressible outer weather gasket of the dual gasket assembly is attached to the exterior gasket support by
  i) a projection extending from the exterior gasket support seated in a cavity in the compressible outer weather gasket, or
  ii) a projection extending from the compressible outer weather gasket seated in a cavity in the exterior gasket support.

In some preferred embodiments, the interior gasket support and the exterior gasket support each has at least one projection or cavity for the attachment of a gasket. As used herein, a "projection" extending from a part means the part has an appendage extending (or jutting out) from the part that has a suitable size and shape that it can be inserted into a suitably-sized and shaped cavity in a second part and seated in that cavity to connect or attach the two parts together. In some embodiments the projection is known as a "dart" and can have any shape typically used for such dart as conventionally known, such as, an arrow shape, a tree shape, a barbed shape, or a "T" shape. The associate cavity with each of these shapes is an opening in the part that allows the shape to be entered and seated in that part.

By "seat" or "seated" it is meant the projection is mechanically retained or held in the cavity to secure the projection in the cavity and connect or attach the two parts together. By cavity, it is meant a pocket, channel, unfilled space, or hollowed-out space into the surface of a part that has a suitable size and shape that can accept and seat a suitably-sized and shaped projection.

When projections and cavities are used, they must adequately attach each gasket and gasket support together such that the dual gasket assembly can further be attached to an edge face of a panel and the gaskets remain attached if the panel is moved; and further, the gaskets can be compressed between two adjacent edge faces without either gasket detaching from its gasket support. Alternatively, the support coupling can first be attached to an edge face of a panel, followed by the attachment of each gasket with any combination of projections and cavities, which again must adequately attach each gasket and gasket support such that the gaskets remain attached if the panel is moved; and further, the gaskets can be compressed between two adjacent edge faces without either gasket detaching from its gasket support.

Many different arrangements of projections and cavities are contemplated. For example, a linear-arranged set of individually-separated gasket darts and a compatible linear-arranged set of individually-separated gasket support cavities, both linear arrangements oriented parallel to the gutter channel when installed and extending essentially the length of the support coupling could be used, with the number of attachment points dictated by the gasketing application. In a preferred embodiment, the projection is a continuous projection, meaning that it extends essentially the length of the support coupling oriented parallel to the gutter channel when installed. Likewise, a preferred embodiment, the cavity is a continuous channel, again meaning that it extends essentially the length of the support coupling oriented parallel to the gutter channel when installed.

In some preferred embodiments, the projection can have a cross-sectional "T" shape, that can in turn be seated in a cavity having a cross-sectional "C" shape as shown by the cross-sectional views of the support coupling and dual gasket assembly of FIGS. 3 & 4. The C-shaped cavity typically forms a channel on or in the support coupling base, the channel oriented parallel to the gutter channel and extending in a preferably continuous manner along the length of the support coupling base. Likewise, the associated gasket will have a T-shaped projection extending in a preferably continuous manner along the length of the gasket.

In some preferred embodiments, the compressible interior gasket and compressible outer weather gasket have the same shape, and one preferred shape is shown in FIG. 4 as a dual-lobed, hollow, flattened, hour-glass shape, the flattened or straight sides of the hour-glass configured to match with the planar edge face of the panels to be sealed. However, there is no requirement the shape of the compressible interior gasket and a compressible outer weather gasket be the same. Other gasket shapes and materials are believed suitable for use in the application. It is believed that many different gasketing materials, having a round or mostly round, curved, or rectangular or mostly rectangular cross section, or combinations thereof, could be used as gaskets in the dual gasket assembly.

In preferred embodiments, the shape of the gaskets and gasket supports are configured such that both the compressible interior gasket and the compressible outer weather gasket are not compressed onto the edge face of a wall panel when the dual gasket assembly is first or solely attached to that edge face. As shown in FIG. 4, the bottom contact surface 48 of each gasket aligns with the bottom surface of the base of the support coupling. This facilitates the installation of the dual gasket assembly on the edge face of a wall panel, as the gaskets do not have to be partially compressed during initial installation on a first panel edge face.

For example, for the preferred embodiment shown in FIG. 4, to install the dual gasket assembly on the edge face of a wall panel, the support coupling can be first attached to the edge face, and then the T-shaped projection of the compressible interior gasket can be slid into the C-shaped interior gasket support of the support coupling to attach the compressible interior gasket. The compressible outer weather gasket can be attached in like matter to the exterior gasket support. Since the base surface of the gaskets is at most flush with the bottom surface of the support coupling, the gaskets can be slid into the C-shaped cavities in the support coupling without substantial friction from the edge face of the wall.

Alternatively, both the compressible interior gasket and the compressible outer weather gasket can be attached to the support coupling, again by sliding each T-shaped gasket projection into its associated C-shaped gasket support on the support coupling to make a fully-assembled dual gasket assembly, and then the support coupling can be attached to the edge face of the wall panel. Again, since the base surface of the gaskets is at most flush with the bottom surface of the support coupling, the dual gasket assembly can be attached without first compressing the gaskets on the edge face of the wall. Both of these techniques allow easier and more precise placement of the dual gasket assembly on the edge face of the wall. Further, this preferred gasket configuration still provides adequate sealing of the abutment joint, as both the compressible interior gasket and the compressible outer weather gasket are later compressed against both edge faces of the abutment joint by contact with a second edge face from another wall to fully seal the abutment joint.

The compressible interior gasket and a compressible outer weather gasket can comprise any resilient material made in a compressible form that can provide adequate sealing and is also adequately durable to withstand the rigors of construction. The specific panel application may also have additional preferred requirements for the gasket material, such as thermal expansion and contraction properties within a certain range, and the ability to remain flexible over time and varying temperatures to handle building sway and movement. It is desirable the compressible outer weather gasket also preferably have adequate weathering properties, such as not being excessively affected by water and/or UV light.

Resilient materials that are believed suitable for use in the compressible interior gasket and the compressible outer weather gasket include elastomeric and rubber materials, including such things as silicone and modified silicone elastomers, ethylene propylene diene monomer (EPDM) rubbers, and other compressible crosslinked elastomers and other flexible polyurethanes and polyethylenes. The compressible forms of the gasket can include open-center and relatively hollow or hollow-lobed constructions as shown in the present figures, or varying types of closed-cell foams.

The compressible interior gasket and a compressible outer weather gasket in the dual gasket assembly are significantly compressed in the sealed abutment joint, therefore open-center, relatively hollow, or hollow-lobed gasket structures are preferred in many embodiments. Specifically, the gaskets of the dual gasket assembly preferably can durably compress such that the breadth of the dual gasket assembly in the compressed state in the sealed abutment joint is at least 80% of the original breadth, preferably at least 75% of the original breadth, and most preferably the breadth of the dual gasket assembly in the sealed abutment joint is at least 50% of the original breadth.

The bottom surface of the base of the dual gasket assembly support coupling has a contact area for stabilizing the support coupling of an edge face of a panel. The bottom surface of the base further has an attachment area for attaching the support coupling to an edge face, the attachment area being at least one surface, projection, or cavity.

An attachment area that is "at least one surface" it is meant to apply to support couplings that require an additional fastener or adhesive to attach a part of the support coupling contact area to the edge face of the panel. Examples of such couplings are shown in FIGS. 3 & 4 where the attachment area is a surface, that is part of the bottom surface 33 of the support coupling that in these illustrations is also part of the support coupling contact area 38.

In many embodiments, the contact area for stabilizing the support coupling on the edge face is larger than the attachment area for attaching the support coupling to said edge face; this is particularly the case when the support coupling is attached to an edge face using an attachment area that is a projection or a cavity. FIG. 5 is a cross-sectional view of an embodiment of the bottom surface of the base of the support coupling wherein the attachment area is at least one projection. The support coupling 50 has a gutter channel 55 formed by two weirs 57, and also has two gaskets supports 59 having darts; the gaskets supports further form two other optional channels 56 that could potentially be used for draining water also. As shown, support coupling 50 has a base attachment area 51 that has at least one projection 52 attaching the support coupling to the edge face 53 of a panel (the dotted line indicating the position of the edge face of the panel). The attachment area is considered the area on the bottom surface of the base, in the plane of the bottom surface on the base, that provides for the attachment of the support coupling to the edge face.

The projection 52 shown in FIG. 5 has a beveled "T" shape, designed to be slid or fitted into a C-shaped channel (or cavity) in the edge face 53 of the panel. Additionally, FIG. 5 illustrates a support coupling wherein the contact area 54 for stabilizing the support coupling on the panel edge face and the base attachment area 51 are not the same.

Alternatively, the support coupling can have an attachment area that is a cavity in the support coupling base that is suitable for attaching the support coupling to the edge face of a panel via a coupling retention projection on the wall panel. In this embodiment, the coupling retention projection extends from the panel edge face and the base attachment area of the support coupling is considered to be the area of the entrance opening into the cavity in the support coupling base, in the plane of the bottom surface of the base.

In some embodiments, the dual gasket assembly is suitable for sealing an abutment joint between a first surface area of a first edge face of a first panel to a second surface area of a second edge face of a second panel. On the first panel, the first surface area to be sealed is generally a rectangular area on the first edge face and has a major axis having a first surface length and a minor axis having a first surface width; and on the second panel, the second surface area to be sealed is also generally a rectangular area on the second edge face and has a major axis having a second surface length and a minor axis having a second surface width. In some embodiments, the at least one gutter channel for directing water has a length equivalent to the first surface length of the first surface area.

Figure 7:
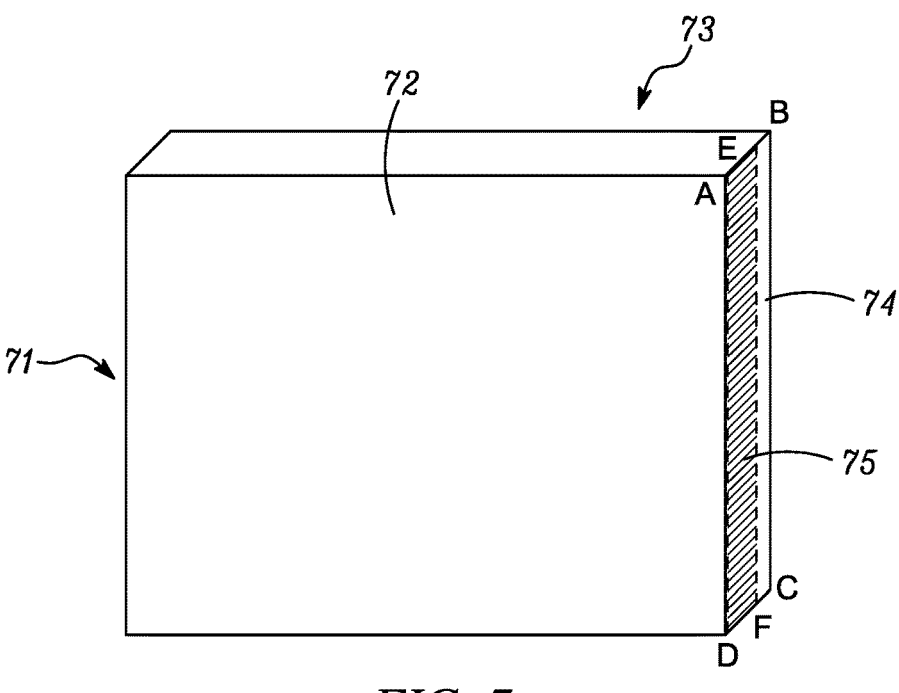
FIG. 7 is a perspective view of one representation of a panel 1 having a rectilinear shape and six sides, the six sides including two major faces and four edge faces.

FIG. 7 is a perspective view of a panel 71 having a rectilinear shape, the panel having six sides. The six sides include two major faces and four edge faces. Shown is a first major face 72 that is the frontside of the panel and an opposing second major face 73 that is the backside of the panel. When the panel is used in building construction, generally, the first major face 72 (or frontside face) is the face of the panel that is either exposed to the weather or is the face that is closest to and facing the exterior of a building; while the opposing second major face 73 (or backside face) is the face of the panel that is the interior wall of the building or is closest to and facing the interior of the building.

A dual gasket assembly is used to seal an abutment joint between a first edge face of a first panel and a second edge face of a second panel by sealing a first surface area of the first edge face of the first panel to a second surface area of the second edge face of the second panel. FIG. 7 illustrates on a first panel the first surface area to be sealed that is the shaded area on a first edge face of that panel. The first surface area has a major axis having a first surface length and a minor axis having a first surface width, the major axis being the longer dimension of the surface area on that edge face and the minor axis being the shorter dimension of the surface area on that same edge face. Likewise, but not shown, the second surface area to be sealed of the second edge face of the second panel similarly has a major axis having a second surface length and a minor axis having a second surface width, the major axis being the longer dimension of the surface area on that edge face and the minor axis being the shorter dimension of the surface area on that same edge face.

Ultimately, the gap between this first surface area of the first edge face of the first panel and the second surface area of the second edge face of the second panel is sealed via the use of a dual gasket assembly. However, for clarity, the features of the first panel will be discussed first.

Specifically, FIG. 7 illustrates a first edge face 74 of the first panel, the first edge face having a first edge face area designated by the corner points A-B-C-D. The first edge face is perpendicular to, or generally perpendicular to, both the first major face 72 and the opposing second major face 73 of the first panel, the first edge face having a first surface area 75 to be sealed, designated by the corner points A-E-F-D.

By use of the phrase "surface area to be sealed" it is meant the surface area on the edge face of a panel that will include at least partial contact with the dual gasket assembly after the gasket assembly is fully installed between the edge faces of two panels, thereby sealing the abutment gap. It is not necessary for the dual gasket assembly to be in contact with the entire width of an edge face to seal the abutment joint. In many instances, the width of the dual gasket assembly will not be as wide as the thickness of the panel, and generally it is desirable for the dual gasket assembly be placed nearer to the outer face of the panel (major face 72) and wall rather than nearer to the inner face of the panel (major face 73) and wall, sealing an area as shown by the shading in FIG. 7. In some embodiments, it will be desirable for the dual gasket assembly be placed such that that dual gasket assembly is flush with the outer face of the panel (major face 72), giving the wall an essentially continuous surface look. In some other embodiments, it will be desirable for the dual gasket assembly be placed such that that dual gasket assembly is not flush with the outer face of the panel but is recessed inwardly between the panels from the outer face of the wall; this could provide a wall surface wherein the panels and joints are much more defined, if that is the aesthetic look that is desired.

The first surface area 75 to be sealed further has a first surface length, which is represented by distance between points A-D or E-F, as the surface is generally rectangular; and a first surface width, which is represented by distance between points A-E or D-F, again as the surface is generally rectangular. Further, the surface area 75 to be sealed shown in FIG. 7 is a preferred embodiment; generally, the surface area 75 to be sealed has a first surface width A-E or D-F that is less than the width of the entire first edge face A-B or D-C, and the surface area 75 to be sealed is located closer to the frontside face (major face 72) of the panel than to the backside face (major face 73) of the panel. However, the first surface width A-E or D-F of the surface area 75 could be as wide as the first edge face 74, or the first surface width A-E or D-F could be positioned at any point within the width of the first edge face 74.

In typical rectilinear wall construction, the first major face 72 of the first panel lies in an outer plane that extends in all directions from the panel, and a plurality of the first major faces of other such panels forms an outer wall surface. Similarly, the opposing second major face 73 of the first panel lies in an inner plane that extends in all directions from the panel, and a plurality of the second major faces of other such panels forms an inner wall surface.

Wall Panel Module

This invention also relates to a wall panel module comprising a first wall panel and a dual gasket assembly attached thereto. The first wall panel has a first major face and an opposing second major face, the first and second major faces lying in a set of parallel planes, the first wall panel further having a first edge face being generally perpendicular to both the first major face and the opposing second major face.

In some preferred embodiments, the panel has a rectilinear shape, the panel having six sides, including two major faces and four edge faces.

The dual gasket assembly attached to the wall panel is suitable for sealing an abutment joint between edge faces of two wall panels, the abutment joint having a length, width, and depth. The dual gasket assembly comprises a support coupling, a compressible interior gasket, and a compressible outer weather gasket. The support coupling of the dual gasket assembly comprises a base, the base having a top surface and a bottom surface, and the top surface of the base optionally, but preferably having at least one gutter channel for directing water. The top surface further has an interior gasket support and an exterior gasket support with the interior gasket support and the exterior gasket support on opposing ends of the base; and if the at least one gutter channel is present, the interior gasket support and an exterior gasket support are separated by the at least one gutter channel.

The compressible interior gasket is attached to the interior gasket support and the compressible outer weather gasket is attached to the exterior gasket support of each support coupling, with each compressible interior gasket and compressible outer weather gasket having a length that is the gasket length that is parallel to the length of the dual gasket assembly. Additionally, the compressible interior gasket and the compressible outer weather gasket are mounted on the support coupling with the lengths of the compressible interior gasket and the compressible outer weather gasket parallel to one another, those lengths also being parallel to the length of the dual gasket assembly, with both gaskets further bounded by the set of parallel planes extending from the first and second major faces of the first wall panel, to form each dual gasket assembly. The bottom surface of each support coupling base further has an attachment area, with each dual gasket assembly attached to an edge face of the first wall panel via said attachment area.

Figure 8:
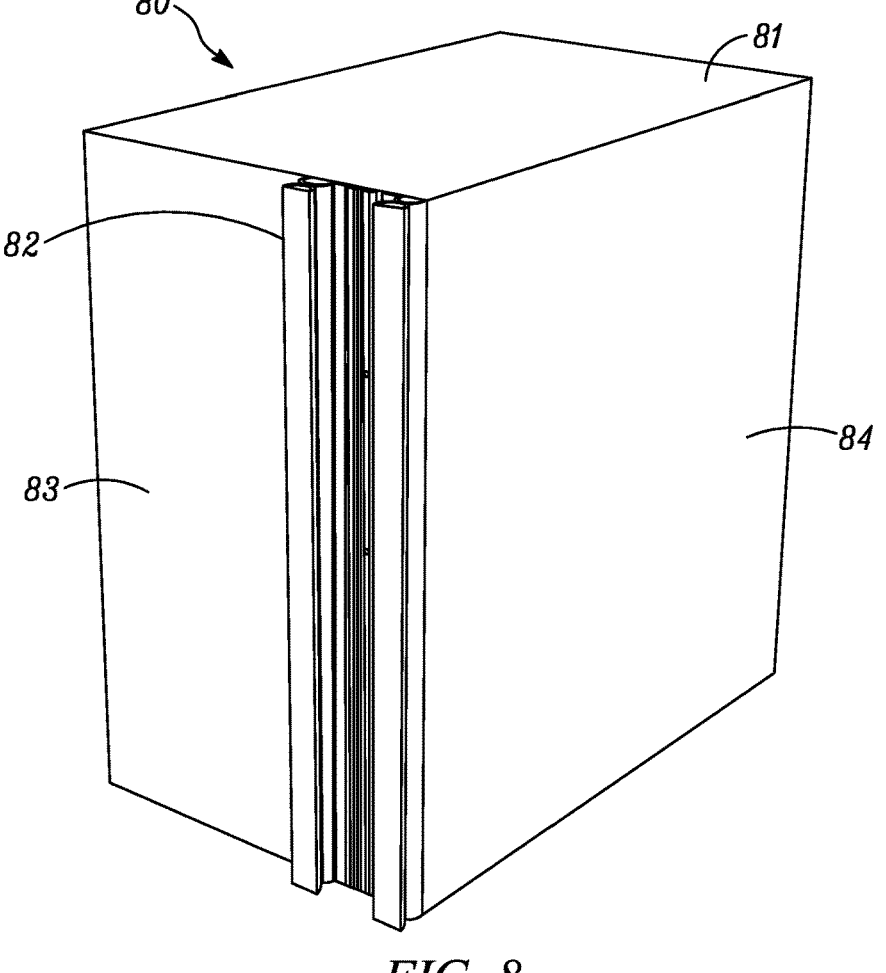
FIG. 8 is a perspective view of a panel module comprising a panel and a dual gasket assembly attached to an edge face of the panel.

FIG. 8 is view of a wall panel module 80 comprising a panel 81 and a single dual gasket assembly 82 attached to an edge face 83 of the panel. FIG. 8 illustrates, similarly to FIG. 7, that it is not necessary for the dual gasket assembly to be in contact with the entire width of an edge face to seal the abutment joint. As shown in FIG. 8, the width of the dual gasket assembly is not as wide as the width of the edge face (the thickness of the panel), and the dual gasket assembly is placed nearer to the outer face 84 of the panel rather than nearer to the opposing inner face of the panel, sealing an area similar to the shaded area designated by the corner points A-E-F-D in FIG. 7.

In some embodiments, the wall panel module has a dual gasket assembly having an attachment area that comprises at least one surface, projection, or cavity. In some embodiments, the wall panel module has a dual gasket assembly wherein the interior gasket support and compressible interior gasket of the dual gasket assembly are integral.

In some embodiments, the wall panel module has a dual gasket assembly wherein the compressible interior gasket is attached to the interior gasket support by either i) a projection extending from the interior gasket support seated in a cavity in the compressible interior gasket, or ii) a projection extending from the compressible interior gasket seated in a cavity in the interior gasket support.

In some embodiments, the wall panel module has a dual gasket assembly wherein the compressible outer weather gasket is attached to the exterior gasket support by i) a projection extending from the exterior gasket support seated in a cavity in the compressible outer weather gasket, or ii) a projection extending from the compressible outer weather gasket seated in a cavity in the exterior gasket support.

In some embodiments, the wall panel module has a dual gasket assembly having a support coupling wherein the contact area for stabilizing the support coupling of the dual gasket assembly on a panel edge face is larger than the attachment area for attaching the support coupling to said edge face.

In some embodiments, the wall panel module has a dual gasket assembly having a length corresponding to the length of the abutment joint to be sealed between the two wall panels.

In some embodiments, the wall panel module has a dual gasket assembly having a support coupling having a length corresponding to the length of the abutment joint between the two wall panels.

In some embodiments, the wall panel module has a dual gasket assembly having a width that is less than the width of the abutment joint between the two wall panels.

Although not repeated herein for conciseness, any of the features, options, and elements described herein for the dual gasket assembly or any of the components thereof equally apply to the wall panel module comprising a dual gasket assembly.

Wall Panel Module Comprising Multiple Dual Gasket Assemblies

In some embodiments, the wall panel module can comprise a first wall panel and a plurality of dual gasket assemblies attached thereto; the first wall panel having a first major face and an opposing second major face and the first and second major faces lying in a set of parallel planes. The first wall panel further has a plurality of edge faces being generally perpendicular to both the first major face and the opposing second major face, each edge face having an edge face width that is the thickness of the first panel and an edge face length that is the length of the edge face perpendicular to the edge face width. Each of the dual gasket assemblies attached to the first wall panel are suitable for sealing an abutment joint between the edge face or the first wall panel and another wall panel, the abutment joint having a length, width, and depth as determined by the dimensions of the individual wall panels being sealed. As previously described herein, each dual gasket assembly comprises a support coupling, a compressible interior gasket, and a compressible outer weather gasket; and each support coupling comprises a base, the base having a top surface and a bottom surface, the top surface further having an interior gasket support and an exterior gasket support on opposing ends of the support coupling. Preferably, the top surface of each base of the support coupling further comprises at least one gutter channel for directing water, and the interior gasket support and the exterior gasket support are separated by that at least one gutter channel.

The compressible interior gasket is attached to the interior gasket support and the compressible outer weather gasket is attached to the exterior gasket support of each support coupling, with each compressible interior gasket and compressible outer weather gasket having a length that is the gasket length that is parallel to the length of the dual gasket assembly. Additionally, the compressible interior gasket and the compressible outer weather gasket are mounted on the support coupling with the lengths of the compressible interior gasket and the compressible outer weather gasket parallel allel to one another, those lengths also being parallel to the length of the dual gasket assembly, with both gaskets further bounded by the set of parallel planes extending from the first and second major faces of the first wall panel, to form each dual gasket assembly. The bottom surface of each support coupling base further has an attachment area, with each dual gasket assembly attached to an edge face of the first wall panel via said attachment area.

Although not repeated herein for conciseness, any of the features, options, and elements described herein for the dual gasket assembly or wall panel module comprising a dual gasket assembly, or any of the components thereof, equally apply to the wall panel module comprising a plurality of dual gasket assemblies.

Figure 9:
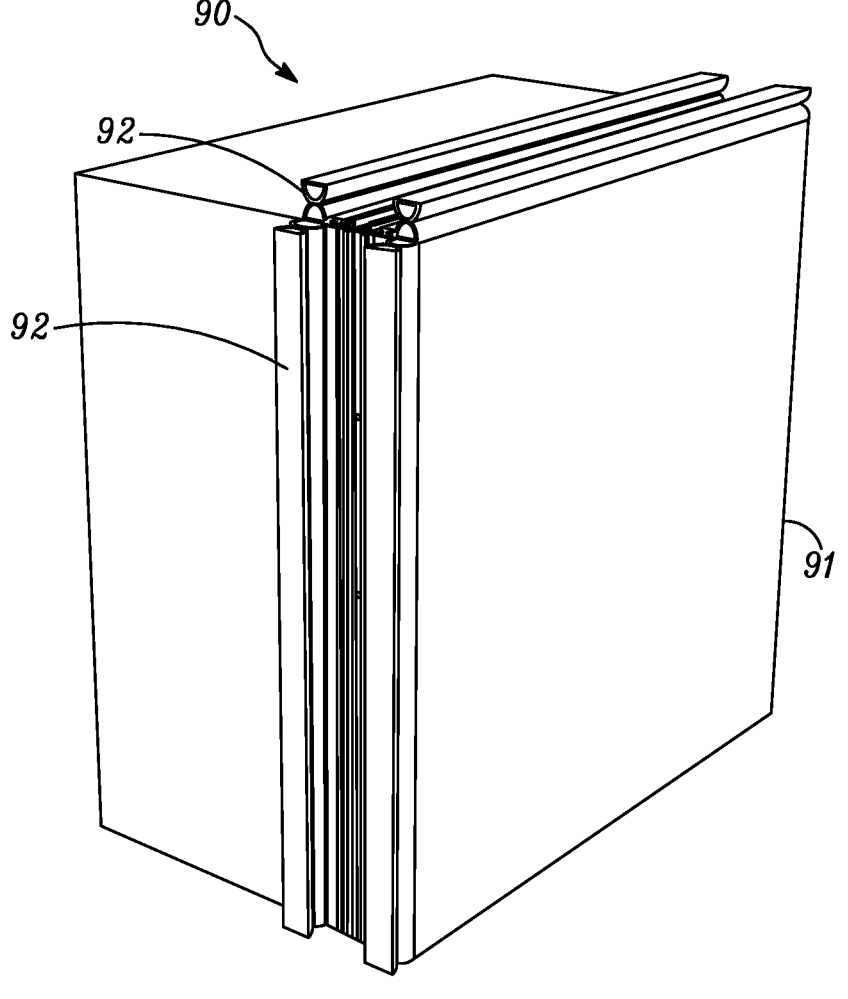
FIG. 9 is a perspective view of a panel module comprising a panel and two dual gasket assemblies attached to two edge faces of the panel.

The building 62 shown in FIG. 6 comprises a plurality of panels 60 and there are multiple panel-to-panel joints shown, each joint between each set of panels. Representative joints in this figure are panel-to-panel joints 64a, 64b, 64c, and 64d shown around one of the rectangular panels 60. 64a and 64c represent vertically-oriented panel-to-panel joints, while 64b and 64d represent horizontally-oriented panel-to-panel joints. In some wall construction there is a desire for modular units that can be used interchangeably; a wall panel module comprising a wall panel and one or more dual gasket assemblies attached thereto can provide such a modular unit. Many such types of modular wall panel modules are possible. For example, a wall panel module could include a rectangular panel wherein each of the four edge faces having attached thereto a dual gasket assembly, for a total of four dual gasket assemblies in that wall panel module. However, a more practical wall panel module, especially for a building 62 such as shown in FIG. 6, and considering a desire for interchangeable panel modules, is a wall panel module that has two dual gasket assemblies attached to the wall panel. Since many wall panels are rectangular, having one side longer than the other, a wall panel module comprising a single horizontally-mounted dual gasket assembly, and a single vertical dual gasket assembly (each mounted on edge faces that are perpendicular to one another) can provide a useful interchangeable modular wall panel. For example, FIG. 9 is view of a wall panel module 90 comprising a panel 91 and two dual gasket assemblies 92 attached to two edge faces of the panel, specifically vertical and horizontal edge faces of the panel. FIG. 9 illustrates, similarly to FIGS. 7 & 8, that it is not necessary for the dual gasket assembly to be in contact with the entire width of an edge face to seal the abutment joint. Like FIG. 8, the width of each of the dual gasket assemblies is not as wide as the width of each edge face (the thickness of the panel), and each of the dual gasket assemblies is placed nearer to the outer face of the panel rather than nearer to the opposing inner face of the panel, sealing an area similar to the shaded area designated by the corner points A-E-F-D in FIG. 7.

Processes for Making a Wall Panel Module

This invention also relates to a process for making a wall panel module comprising a wall panel and a dual gasket assembly, the process comprising the steps of:

a) forming a first dual gasket assembly comprising a compressible interior gasket, a support coupling, and a compressible outer weather gasket, wherein each of the compressible interior gasket and the compressible outer weather gasket have a length that is the gasket length parallel to a length of the dual gasket assembly, the compressible interior gasket and the compressible outer weather gasket mounted on the support coupling with the lengths of the compressible interior gasket and the compressible outer weather gasket being parallel to one another, b) providing a first wall panel having a first major face and an opposing second major face, the first and second major faces lying in a set of parallel planes, the first wall panel further having a first edge face that is generally perpendicular to both the first major face and the opposing second major face, the first edge face having an edge face length that is the height of the first panel and an edge face width that is the thickness of the first panel, c) positioning the first dual gasket assembly adjacent to the first edge face of the first panel in an area bounded by the set of parallel planes, the lengths of the compressible interior gasket and the compressible outer weather gasket being parallel to the edge face length, with both gaskets further bounded by the set of parallel planes, and d) attaching the support coupling of the first dual gasket assembly to the first edge face of the first wall panel to form a wall panel module.

In some embodiments of this process, the support coupling of the dual gasket assembly comprises a base, the base having a top surface and a bottom surface, the top surface further having an interior gasket support and an exterior gasket support on opposing ends of the support coupling, the compressible interior gasket attached to the interior gasket support and the compressible outer weather gasket attached to the exterior gasket support; and the bottom surface of the support coupling base further comprises an attachment area for attaching the support coupling to the first edge face of the first wall panel.

In some embodiments of this process, the top surface of the base of the support coupling further comprises at least one gutter channel for directing water and the interior gasket support and the exterior gasket support are separated by said at least one gutter channel. Further, the support coupling of the dual gasket assembly can be attached to the first edge face of the first wall panel by the attachment area of the dual gasket assembly.

If desired, in this process, the interior gasket support and compressible interior gasket of the dual gasket assembly can be integral. Alternatively, the compressible interior gasket can be attached to the interior gasket support by either i) a projection extending from the interior gasket support seated in a cavity in the compressible interior gasket, or ii) a projection extending from the compressible interior gasket seated in a cavity in the interior gasket support.

The compressible outer weather gasket in this process can be attached to the exterior gasket support by i) a projection extending from the exterior gasket support seated in a cavity in the compressible outer weather gasket, or ii) a projection extending from the compressible outer weather gasket seated in a cavity in the exterior gasket support.

In some embodiments of this process, the contact area for stabilizing the support coupling on the edge face is larger than the attachment area for attaching the support coupling to said edge face. Further, in this process, the support coupling of the dual gasket assembly can have a length corresponding to the edge face length of the first edge face; and the dual gasket assembly can have a width that is less than the edge face width length of the first edge face.

Although not repeated herein for conciseness, any of the features, options, and elements described herein for the dual gasket assembly, or wall panel module comprising a dual gasket assembly, or the wall panel module comprising a plurality of dual gasket assemblies, any of the components of any of these, equally apply to the process for making a wall panel module comprising a dual gasket assembly.

In some embodiments, this process can be further used to make a wall panel module comprising multiple dual gasket assemblies. Specifically, in some embodiments, this invention relates to a process for making a wall panel module comprising a wall panel and a plurality of dual gasket assemblies, the process comprising the steps of:

a) forming a plurality of dual gasket assemblies, each dual gasket assembly comprising a compressible interior gasket, a support coupling, and a compressible outer weather gasket, wherein each of the compressible interior gasket and the compressible outer weather gasket have a length that is the gasket length parallel to the length of the dual gasket assembly, the compressible interior gasket and the compressible outer weather gasket are mounted on the support coupling with the lengths of the compressible interior gasket and the compressible outer weather gasket being parallel to one another, b) providing a first wall panel having a first major face and an opposing second major face, the first and second major faces lying in a set of parallel planes, the first wall panel further having a plurality of edge faces that are generally perpendicular to both the first major face and the opposing second major face, each edge face having an edge face length that is either the vertical or horizontal length of the first panel and an edge face width that is the thickness of the first panel, c) positioning each dual gasket assembly adjacent to one of the edge faces of the first panel in an area bounded by the set of parallel planes, the lengths of the compressible interior gasket and the compressible outer weather gasket being parallel to the edge face length, with both gaskets further bounded by the set of parallel planes, and d) attaching the support coupling of each dual gasket assembly to said edge face to form a wall panel module.

Although not repeated herein for conciseness, any of the features, options, and elements described herein for any of the components or steps used in the processes for making a wall panel comprising a dual gasket assembly can equally apply to processes for making a wall panel comprising multiple dual gasket assemblies.

Another embodiment of a process for making a wall panel module comprising a wall panel and a dual gasket assembly comprises the steps of:

a) providing a first wall panel having a first major face and an opposing second major face, the first and second major faces lying in a set of parallel planes, the first wall panel further having a first edge face that is generally perpendicular to both the first major face and the opposing second major face, the first edge face having an edge face length that is the height of the first panel and an edge face width that is the thickness of the first panel, b) providing a support coupling for the dual gasket assembly, the support coupling having a length that is the length parallel to a length of the dual gasket assembly, the support coupling comprising a base, the base having a top surface and a bottom surface, the top surface further having an interior gasket support and an exterior gasket support on opposing ends of the support coupling, the bottom surface of the support coupling base further comprising an attachment area for attaching the support coupling to the first edge face of the first wall panel, c) attaching the support coupling of the first dual gasket assembly to the first edge face of the first wall panel, wherein a length of the support coupling is parallel to the edge face length of the first edge face, and d) attaching the compressible interior gasket to the interior gasket support and the compressible outer weather gasket to the exterior gasket support; the lengths of the compressible interior gasket and the compressible outer weather gasket being parallel to the edge face length, with both gaskets further bounded by said set of parallel planes.

In this process, the top surface of the base of the support coupling can further comprise at least one gutter channel for directing water and the interior gasket support and the exterior gasket support are separated by said at least one gutter channel. Additionally, in this process the support coupling can be attached to the first edge face of the first wall panel by the attachment area.

In this process, the compressible interior gasket can be attached to the interior gasket support by either i) a projection extending from the interior gasket support seated in a cavity in the compressible interior gasket, or ii) a projection extending from the compressible interior gasket seated in a cavity in the interior gasket support.

Likewise, in this process the compressible outer weather gasket can be attached to the exterior gasket support by i) a projection extending from the exterior gasket support seated in a cavity in the compressible outer weather gasket, or ii) a projection extending from the compressible outer weather gasket seated in a cavity in the exterior gasket support.

In this process, the contact area for stabilizing the support coupling on the edge face can be larger than the attachment area for attaching the support coupling to said edge face. Further, in this process the support coupling of the dual gasket assembly can have a length corresponding to the edge face length of the first edge face; and after assembly, the dual gasket assembly can have a width that is less than the edge face width length of the first edge face. Any other features or elements described herein for the dual gasket assembly, wall panel, or wall panel module can be used in the process for making the panel module.

In another embodiment, this process can be used to make a wall panel module comprising multiple dual gasket assemblies. Specifically, in some embodiments, this invention relates to a process for making a wall panel module comprising a wall panel and a plurality of dual gasket assemblies, the process comprising the steps of:

a) providing a first wall panel having a first major face and an opposing second major face, the first and second major faces lying in a set of parallel planes, the first wall panel further having a plurality of edge faces that are generally perpendicular to both the first major face and the opposing second major face, each edge face having an edge face length that is either the vertical or horizontal length of the first panel and an edge face width that is the thickness of the first panel, b) providing a plurality of dual gasket assembly support couplings, each support coupling having a length, the support coupling comprising a base, the base having a top surface and a bottom surface, the top surface further having an interior gasket support and an exterior gasket support on opposing ends of the support coupling, the bottom surface of the support coupling base further comprising an attachment area for attaching the support coupling to one of the edge faces of the first wall panel, c) attaching each support coupling to one of the edge faces of the first wall panel, wherein a length of the support coupling is parallel to the edge face length of said edge face, and d) attaching on each support coupling a compressible interior gasket to the interior gasket support and a compressible outer weather gasket to the exterior gasket support; the lengths of the compressible interior gasket and the compressible outer weather gasket being parallel to the edge face length, with both gaskets further bounded by said set of parallel planes, to form a dual gasket assembly attached to the edge face.

Although not repeated herein for conciseness, any of the features, options, and elements described herein for any of the components or steps used in the processes for making a wall panel comprising a dual gasket assembly can equally apply to processes for making a wall panel comprising multiple dual gasket assemblies.

Water Drainage Duct and Gasket Connector

In some embodiments, the wall system further comprises a water drainage duct for draining water from a dual gasket assembly, or from a plurality of dual gasket assemblies. As previously disclosed herein, the dual gasket assembly is suitable for sealing an abutment joint between two wall panels, the dual gasket assembly comprising a support coupling, a compressible interior gasket, and a compressible outer weather gasket, with the support coupling comprising a base, the base having a bottom surface and a top surface. Additionally, the bottom surface of the base has a contact area for stabilizing the support coupling on an edge face of one of the two wall panels, the support coupling further having an attachment area for attaching the support coupling to said edge face, the top surface of the base having an interior gasket support and an exterior gasket support, the top surface further having at least one gutter channel for directing water, the interior gasket support and the exterior gasket support separated by said at least one gutter channel, with the compressible interior gasket attached to the interior gasket support and the compressible outer weather gasket attached to the exterior gasket support.

Figure 10:
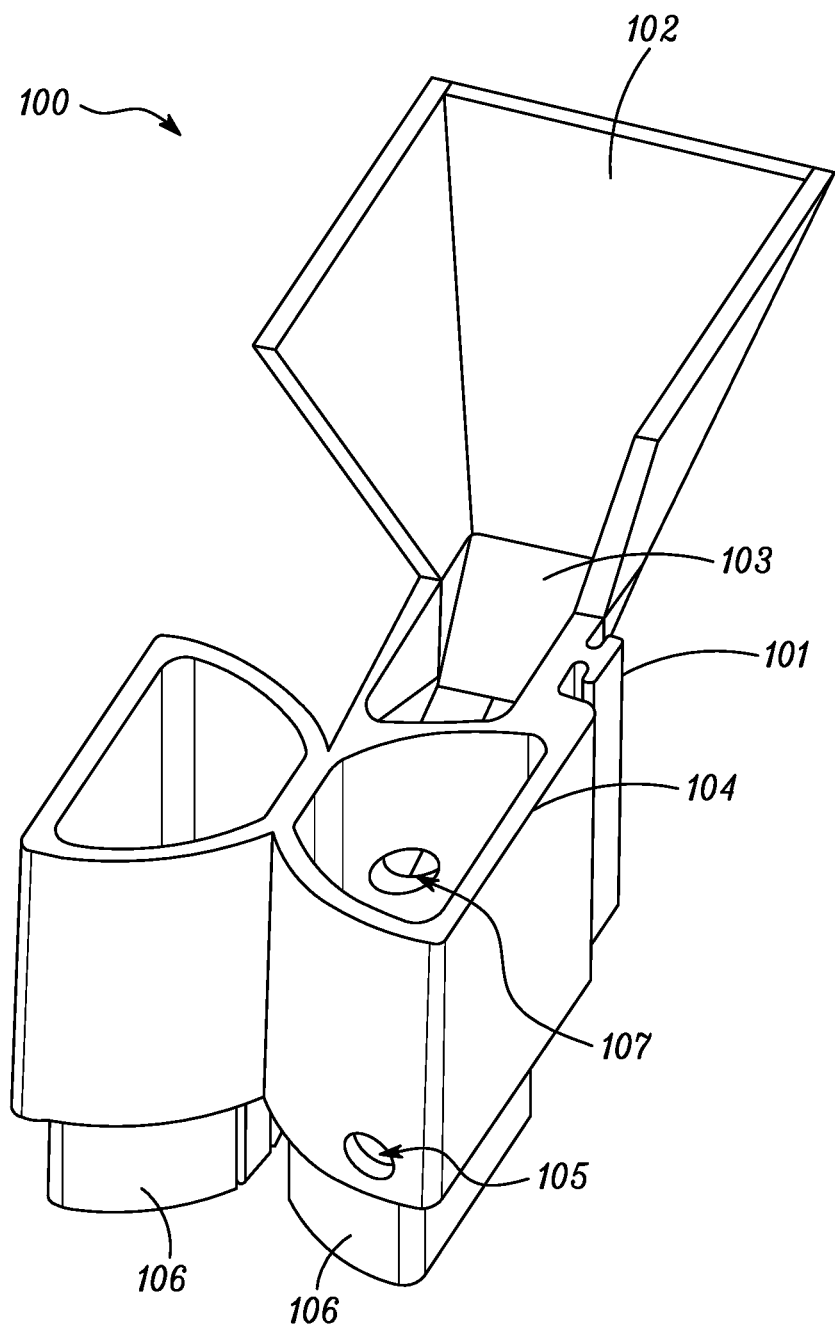
FIG. 10 is a view of a water drainage duct comprising a body having an attachment accessory, a water collection area, a water drainage channel, and a compressible gasket having an exterior port.
Figure 11:
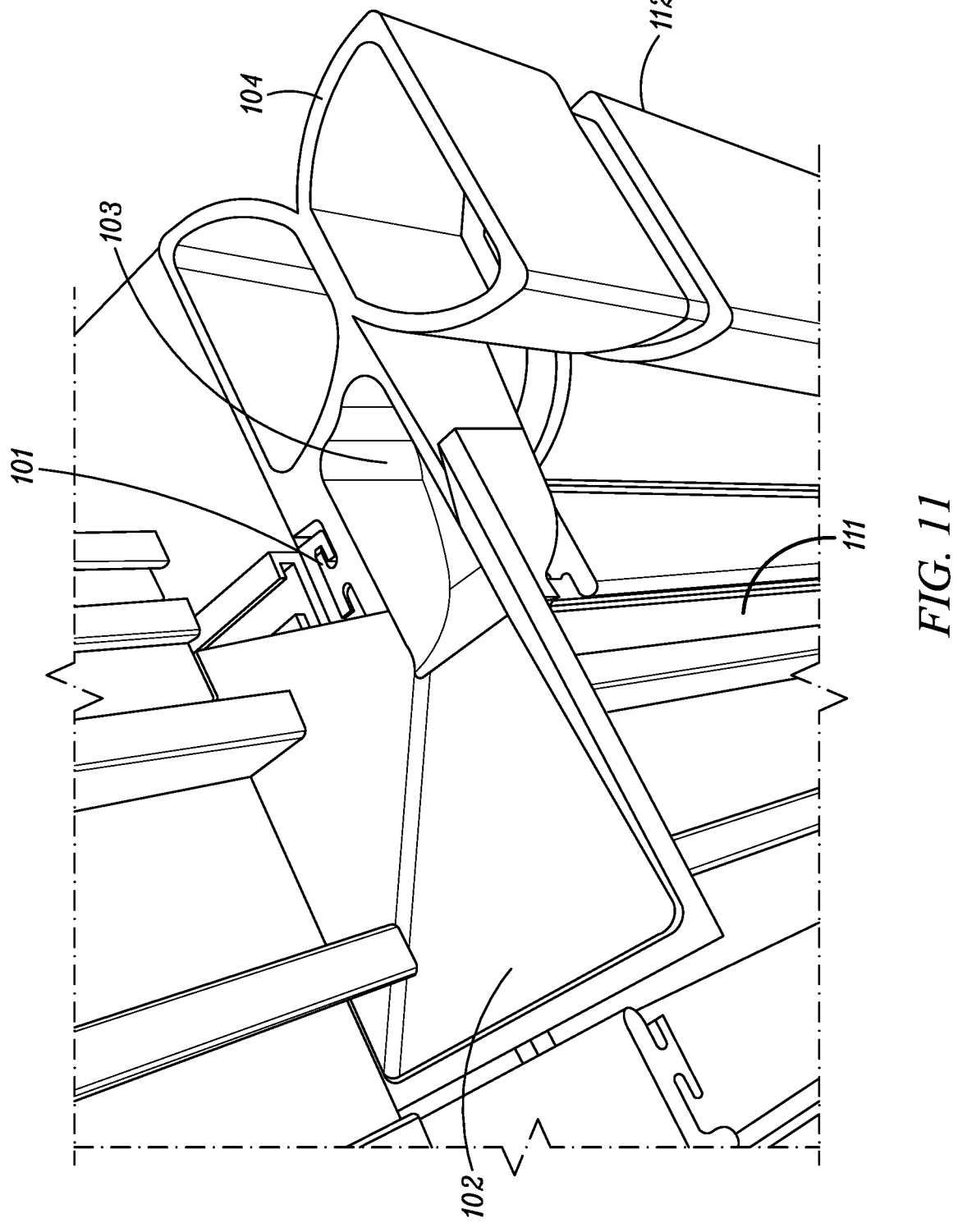
FIGS. 11 & 12 are illustrations of the installation and function of the water drainage duct as combined with a dual gasket assembly at a confluence of dual gasket assemblies, shown in cut-away and partially assembled.

As shown in FIGS. 10 & 11, the water drainage duct 100 comprises a body having an attachment accessory 101 for attachment to the support coupling of a dual gasket assembly, the body further having a water collection area 102, a water drainage channel 103, and a compressible gasket 104 having an exterior port 105, wherein the water collection area is in fluid communication with the exterior port in the compressible gasket via the water drainage channel to allow water to move by gravity from the water collection area to and through the exterior port. The compressible gasket 104 shown in FIGS. 10 & 11 has a hollow, flattened hourglass shape, the shape having two hollow lobes. One of the lobes further has an exterior port 105 through which water ultimately drains from the wall. While these figures illustrate one preferred compressible gasket shape, other shapes are possible.

The water drainage duct has an attachment accessory for attachment of the water duct body to the support coupling of the dual gasket assembly. In some embodiments, the attachment accessory comprises at least one cavity or projection that is compatible with a cavity or projection on the support coupling. As shown in FIGS. 10 & 11, in some embodiments, the water drainage duct can have an attachment accessory 101 having a structure for attachment of the water duct body to a vertically-oriented support coupling 111 of a vertically-oriented dual gasket assembly 112, with the water collection area of the water duct at a higher vertical height than the exterior port in the compressible gasket of the water duct body. As shown, the attachment accessory 101 is a T-shaped projection sized to fit in a C-shaped external gasket support on the support coupling base. Preferably, the water drainage duct is attached to the support coupling via the external gasket support on the support coupling base. In this embodiment, the water drainage duct is installed using a process that involves vertically-mounting a dual gasket assembly on the edge face of a panel, with the length of the compressible outer weather gasket cut short, i.e., the length is shorter than the support coupling, so that the compressible gasket of the water drainage duct can be installed in the remaining length of support coupling.

Figure 12:
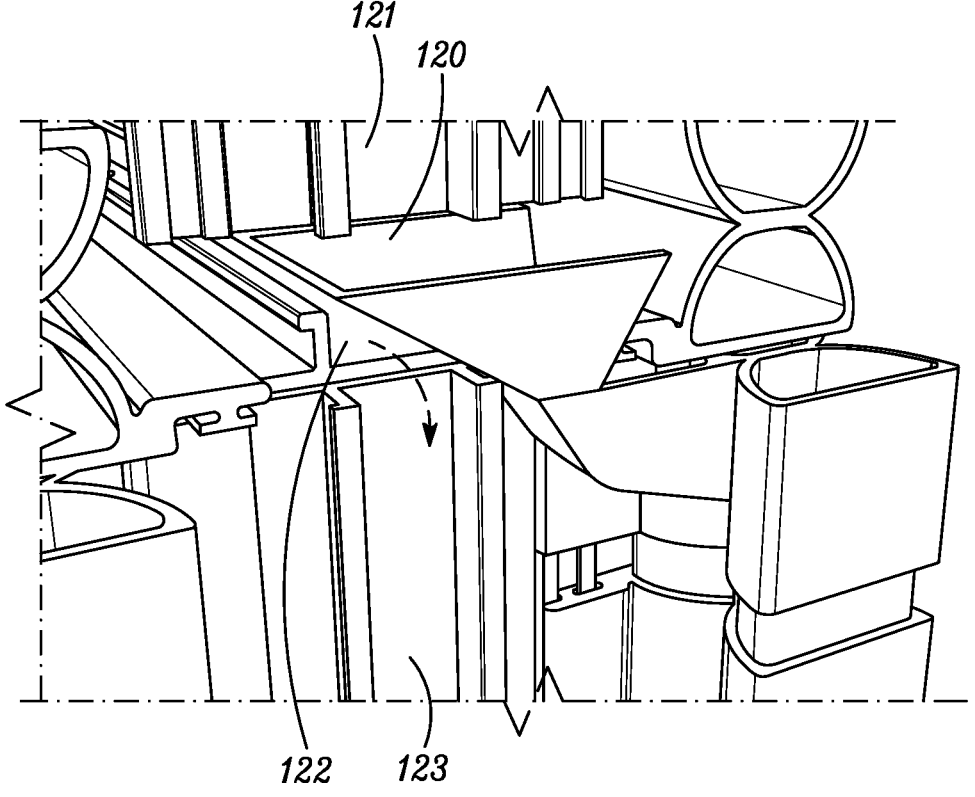

Preferably, the compressible gasket of the water drainage duct further comprises at least one cavity or projection for aligning the compressible gasket of the water drainage duct with a compressible outer weather gasket attached to a vertically-oriented support coupling of the vertically-oriented dual gasket assembly. The embodiment shown in FIG. 10 includes insertable projections 106 that can be seated into the lobes of a similarly-shaped hollow compressible outer weather gasket mounted on the support coupling below the water drainage duct. FIGS. 11 & 12 are shown partially assembled but without compression of the gaskets for clarity, and some of the gaskets have been removed so that the interior of the confluence of dual gasket assemblies can be viewed for the placement of the water duct. Additionally, a portion of the gasket has been cut away to show how the insertable projections 106 are inserted.

In some embodiments, the body of the water drainage duct 100 has a water collection area 102 that is an open-top funnel-like hopper having a three-walled rectangular entrance that is in fluid communication with the water drainage channel 103, with the water drainage channel ending in a discharge exit 107 that is in fluid communication with the exterior port 105 of the compressible gasket 104. Therefore, the water collection area 102 is in fluid communication with the exterior port 105 by a passage using the water drainage channel 103, discharge exit 107, and compressible gasket 104. The passage through the compressible gasket 104 can be achieved using a sloped channel through the gasket, or in some preferred embodiments, the compressible gasket having the exterior port simply has a hollow center. This allows water to collect in the water collection area 102 and then flow, preferably by gravity, down the water drainage channel 103 and through the discharge exit 107, where the water then enters and falls the length of the hollow compressible gasket 104, where it can then flow through and out the exterior port 105 in the gasket.

In preferred embodiments, the water collection area of the water drainage duct is in fluid communication with the at least one gutter channel of the dual gasket assembly. The arrangement shown in FIG. 12 illustrates a preferred arrangement and function of the water drainage duct. As shown, the water collection area 120 of the water drainage duct is aligned with and centered under the gutter channel 121 in a vertically-oriented support coupling of the dual gasket assembly for the abutment joint directly above the water drainage duct. In this figure, some of the gaskets attached to the dual gasket assembly are removed to show the alignment, and the preference that the horizontal dimension of the top of the water drainage duct be sized such that it extends from one gasket support to the other gasket support, meaning that any water between the gasket supports can fall into the water collection area 120. Additionally, in this embodiment, the open top of water collection area 120 of the water drainage duct is aligned above the gutter channel 122 of a horizontally-oriented support coupling of a dual gasket assembly being used to seal the abutment joint directly horizontally adjacent the water drainage duct. A similar, but not shown, horizontally-oriented support coupling and dual gasket assembly for sealing the abutment joint directly horizontally adjacent to, but on the opposing side of the water drainage duct could also be present. It can be appreciated that any water in the horizontal gutter channel 122 (or its companion horizontal gutter channel on the opposing side of the pictured water drainage duct) will not be collected in the specific water collection area 120 of the pictured water drainage duct. Instead, if sufficient water collects in the horizontal gutter channel 122 (or its companion horizontal gutter channel on the opposing side of the pictured water drainage duct) to cause the water to move by leveling, that water will move to the end of the gutter channel and fall downward via gutter channel 123 as shown by the dashed arrow on FIG. 12. Any water that falls down gutter channel 123 could then be collected by another water collection area of a second water drainage duct located below water collection area 120 and removed via that second water drainage duct, which could be positioned at the next confluence of dual gasket assemblies. Therefore, it can be appreciated that the water drainage duct shown in FIG. 12 can actually remove water from any number of dual gasket assemblies, both vertically- and horizontally-oriented, that are sealing abutment joints above the confluence of joints that contains the water drainage duct shown.

The water drainage duct is preferably made from resilient materials, such as resilient materials compatible with and similar to the materials used in the manufacture of the compressible interior gasket and a compressible outer weather gasket. Such materials can include elastomeric and rubber materials, including such things as silicone and modified silicone elastomer, ethylene propylene diene monomer (EPDM) rubber, and other compressible cross-linked elastomers and other flexible polyurethanes and poly-ethylenes.

Although not repeated herein for conciseness, any of the features, options, and elements described herein for any of the components or steps can be applied to the processes for making a paneled wall having sealed abutment joints.
Paneled Wall System This invention also relates to a paneled wall having sealed abutment joints, the wall comprising a first wall panel, a dual gasket assembly, a second wall panel, and a sealed abutment joint between the first wall panel and the second wall panel that is formed by the dual gasket assembly. The dual gasket assembly comprises a compressible interior gasket, a support coupling, and a compressible outer weather gasket as described herein. Each of the first and second wall panels further have a first major face and an opposing second major face, and each of the first and second wall panels further have a plurality of edge faces, with each edge face being generally perpendicular to both the first major face and the opposing second major face of each of the first or second wall panels. The dual gasket assembly is only attached to a first edge face of the first wall panel by the support coupling.

Both the compressible interior gasket and the compressible outer weather gasket of the dual gasket assembly of the first wall panel module are in contact with and compressed between both the first edge face of the first wall panel and the first edge face of the second wall panel to seal the abutment joint between said edge faces.

In some embodiments, this invention relates to a paneled wall having sealed abutment joints, the wall comprising a first wall panel module comprising a first wall panel and a dual gasket assembly, a second wall panel, and a sealed abutment joint between the first wall panel and the second wall panel. This embodiment is especially useful when the paneled wall is made from pre-fabricated wall panel modules.

The paneled wall has abutment joints that contain a single dual gasket assembly between the first and second wall panels forming the abutment joint, and the support coupling of that single dual gasket assembly is attached to one edge face of the first wall panel. However, in some embodiments, such as shown in FIG. 9, the first wall panel further comprises a second dual gasket assembly that is attached to a second edge face of the first wall panel, again by the support coupling in the second dual gasket assembly.

Continuing with this example illustration using two wall panels, in some embodiments, each of the first and second wall panels are rectangular panels having a vertical height, a horizontal width, and a thickness. Therefore, the first and second wall panes each have a total of four edge faces, and each wall panel can comprise at least two dual gasket assemblies, wherein each dual gasket assembly is attached to one of the four edge faces on each panel by the support coupling in each dual gasket assembly.

In some embodiments of the paneled wall, each of the first and second wall panels are aligned such that the first major face of the first wall panel and the first major face of the second wall panel lie in the same first plane, and the opposing second major face of the first wall panel and the opposing second major face of the second wall panel lie in the same second plane, forming a set of parallel major face planes.

In some embodiments, the paneled wall having sealed abutment joints can include, in addition to or in place of the water drainage ducts, inserting other types of gasket con-nectors, including gasket connectors that do not have any provisions for draining water. This type of gasket connector has a shape compatible with the shape of the confluence of the plurality of panel-to-panel joints or the type of connec-tion to be made, and if desired, when installed in the paneled wall is coextensive with the exterior surface of the paneled wall.

Figure 13:
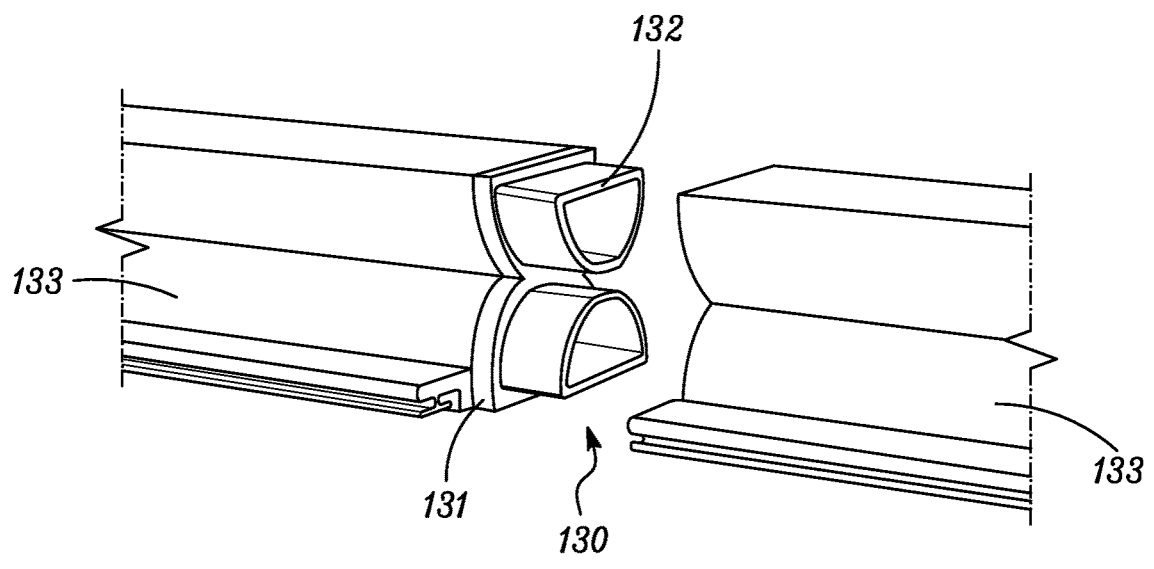
FIG. 13 is a partially exploded illustration of the joining of two gaskets with a 2-way gasket connector
Figure 14:
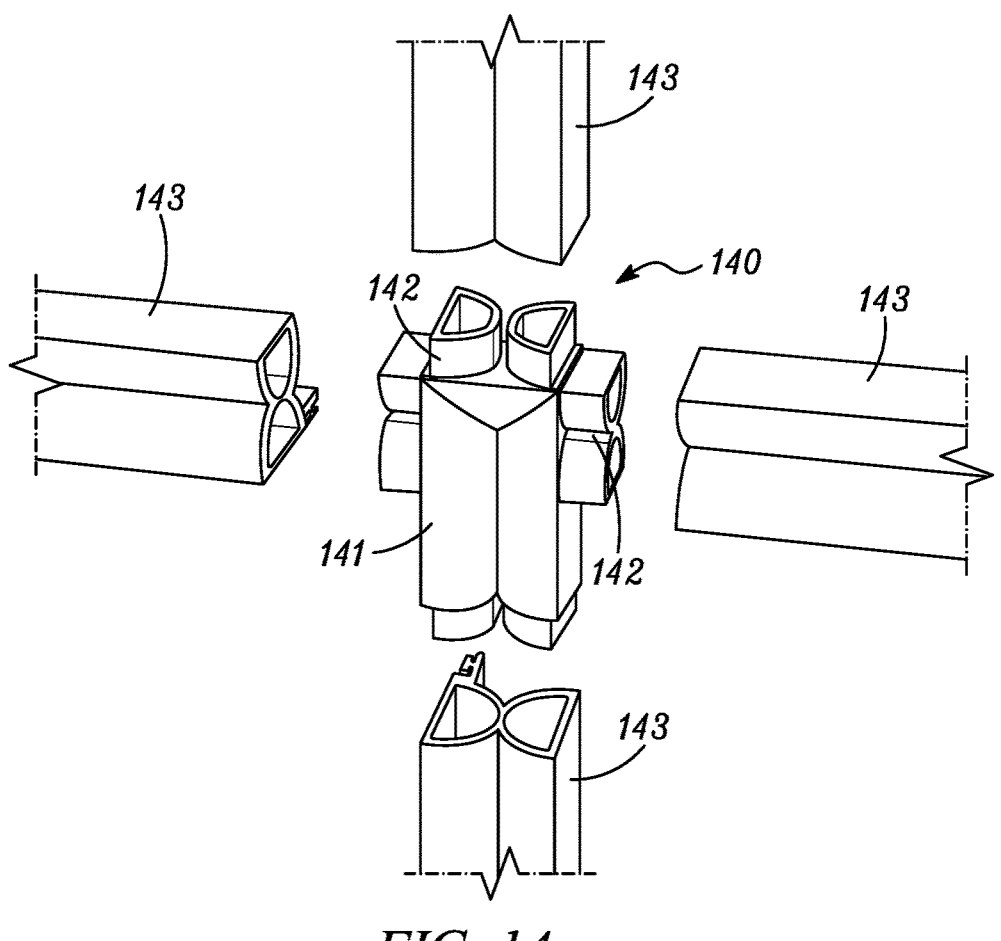
FIG. 14 is a completely exploded illustration of the joining of 4 gaskets using a 4-way gasket connector

FIGS. 13 & 14 illustrate two of many possible types of gasket connectors. Each of the gasket connectors comprise at least one cavity or projection for joining the ends of a compressible gasket, especially when the compressible gas-ket has a hollow center. In some embodiments, the gasket connector has at least two projections for attaching the ends of two separate compressible gaskets. FIG. 13 is a partially exploded illustration of the joining of two gaskets with a 2-way gasket connector 130. 2-way gasket connector 130 comprises a body 131 having one set of two insertable projections 132 that can be seated into the lobes between two similarly-shaped hollow gaskets 133 to join the two gaskets together. The gasket connector can be used with either the compressible interior gasket or the compressible exterior weather gasket of the dual gasket assembly, or both gaskets.

In some embodiments, the gasket connector has at least four projections for attaching the ends of four separate compressible gaskets. FIG. 14 is a completely exploded illustration of the joining of 4 gaskets using a 4-way gasket connector 140. 4-way gasket connector 140 comprises a body 141 having four sets of two insertable projections 142 (only two of the sets pointed out in the figure) that can be seated into the lobes between four similarly-shaped hollow gaskets 143 to join the four gaskets together. Again, the gaskets that are joined can be either the compressible interior gasket or the compressible exterior weather gasket of the dual gasket assembly, or both gaskets.

Gasket connectors are preferably made from resilient materials such as resilient materials compatible with and similar to the materials used in the manufacture of the compressible interior gasket and a compressible outer weather gasket. Such materials can include elastomeric and rubber materials, including such things as silicone and modified silicone elastomer, ethylene propylene diene monomer (EPDM) rubber, and other compressible cross-linked elastomers and other flexible polyurethanes and poly-ethylenes.

Although not repeated herein for conciseness, any of the features, options, and elements described herein for any of the components or steps for making a panel module or dual gasket assembly or sealing abutment joints can be applied to the paneled wall system having a paneled wall with sealed abutment joints.

Process for Making a Paneled Wall having Sealed Abutment Joints

In some embodiments, this invention relates to a process for making a paneled wall having sealed abutment joints, the wall comprising a first wall panel module comprising a first wall panel and a dual gasket assembly, a second wall panel, and a sealed abutment joint between the first wall panel and the second wall panel. As previously described herein, the dual gasket assembly comprises a compressible interior gasket, a support coupling, and a compressible outer weather gasket. Each of the first and second wall panels are rectangular panels having a vertical height, a horizontal width, and a thickness, and each of the first and second wall panels further having a first major face and an opposing second major face. Each of the first and second wall panels additionally having a plurality of edge faces, each edge face having a length that is either a) the vertical height of the first or second wall panel or b) the horizontal width of the first or second wall panel. Each edge face also has a width that is the thickness of either the first or second wall panel; with each edge face being generally perpendicular to both the first major face and the opposing second major face of the first or second wall panel.

The process for making a paneled wall having sealed abutment joints includes the steps of:

a) attaching the dual gasket assembly to a first edge face of a first wall panel to form a first wall panel module, b) positioning a second wall panel relative to the first wall panel module such that the first major face of the first wall panel and the first major face of the second wall panel lie in the same first plane, and the opposing second major face of the first wall panel and the opposing second major face of the second wall panel lie in the same second plane, and both the compressible interior gasket and the compressible outer weather gasket of the dual gasket assembly are in contact with and compressed between both the first edge face of the first wall panel and a first edge face of the second wall panel to seal the abutment joint between said edge faces.

The positioning of the second wall panel can be accomplished in steps if desired. For example, the second wall panel can be first positioned to align the first and second panels within the same plane, but the gaskets of the dual gasket assembly between the panels are not compressed or not fully compressed. The second wall panel can then be further positioned in-plane to compress both the compressible interior gasket and the compressible outer weather gasket of the dual gasket assembly between both the first edge face of the first wall panel and a first edge face of the second wall panel to seal the abutment joint between said edge faces.

In some embodiments, the process for making a paneled wall having sealed abutment joints can further include inserting at a confluence of a plurality of dual gasket assemblies, a water drainage duct for draining water from one or more dual gasket assemblies as previously described herein. As shown in a preferred embodiment in FIGS. 10, 11 and 12, the water drainage duct 100 comprises a body having an attachment accessory 101 for attachment to the support coupling of a dual gasket assembly, the body further having a water collection area 102, a water drainage channel 103, and a compressible gasket 104 having an exterior port 105, wherein the water collection area is in fluid communication with the exterior port in the compressible gasket via the water drainage channel to allow water to move by gravity from the water collection area to and through the exterior port, which is preferably coextensive with the exterior surface of the paneled wall.

The process for making a paneled wall can further comprise installation of a water drainage duct, as previously described herein and shown in FIGS. 10, 11, & 12, at a confluence of a plurality of dual gasket assemblies for draining water from one or more dual gasket assemblies. Additionally, or instead of, the process for making a paneled wall can comprise installation of a gasket connector, as previously described herein, at a confluence of a plurality of dual gasket assemblies; the gasket connector having at least one cavity or projection for joining together the ends of two compressible gaskets. In some embodiments, as shown in FIG. 13, the gasket connector can have at least two projections for attaching the ends of two compressible gaskets; while in other embodiments, the gasket connector as shown in FIG. 14 can have at least four projections for attaching the ends of four compressible gaskets.

Although not repeated herein for conciseness, any of the features, options, and elements described herein for any of the components or steps can be applied to the processes for making a paneled wall having sealed abutment joints.

The invention claimed is:

1. A dual gasket assembly suitable for sealing an abutment joint between two wall panels, the dual gasket assembly comprising a support coupling, a compressible interior gasket, and a compressible outer weather gasket, the support coupling comprising a base, the base having a top surface and a bottom surface, the top surface of the base having at least one gutter channel for directing water, the at least one gutter channel formed between two weirs on the top surface of said support coupling, the top surface further having an interior gasket support and an exterior gasket support, the two weirs located between the interior gasket support and the exterior gasket support, and the interior gasket support and the exterior gasket support, wherein the compressible interior gasket and compressible exterior gasket do not contact the two weirs separated by the at least one gutter channel, the compressible interior gasket attached to the interior gasket support and the compressible outer weather gasket attached to the exterior gasket support; and the bottom surface of the base having a contact area for stabilizing the support coupling on an edge face of one of the two wall panels, the bottom surface further having an attachment area for attaching the support coupling to said edge face, the attachment area being at least one surface, projection, or cavity.

2. The dual gasket assembly of claim 1 wherein the interior gasket support and compressible interior gasket are integral.

3. The dual gasket assembly of claim 1 wherein the compressible interior gasket is attached to the interior gasket support by either i) a projection extending from the interior gasket support seated in a cavity in the compressible interior gasket, or ii) a projection extending from the compressible interior gasket seated in a cavity in the interior gasket support.

4. The dual gasket assembly of claim 1 wherein the compressible outer weather gasket is attached to the exterior gasket support by i) a projection extending from the exterior gasket support seated in a cavity in the compressible outer weather gasket, or ii) a projection extending from the compressible outer weather gasket seated in a cavity in the exterior gasket support.

5. The dual gasket assembly of claim 1 wherein the contact area for stabilizing the support coupling on the edge face is larger than the attachment area for attaching the support coupling to said edge face.

6. The dual gasket assembly of claim 1 wherein the dual gasket assembly has a length corresponding to a length of the abutment joint between the two wall panels.

7. The dual gasket assembly of claim 1 wherein the support coupling has a length corresponding to a length of the abutment joint between the two wall panels.

8. The dual gasket assembly of claim 1 wherein the dual gasket assembly has a width, as measured perpendicular to a length of the abutment joint, from an outer periphery of the compressible interior gasket to an outer periphery of the compressible outer weather gasket, that is less than a width of the abutment joint between the two wall panels.

9. The dual gasket assembly of claim 1 wherein the dual gasket assembly has an original breadth that is greater than a breadth of the abutment joint between the two wall panels.

* * * * *